United States Patent
Jang et al.

(10) Patent No.: US 11,898,767 B2
(45) Date of Patent: Feb. 13, 2024

(54) AIR CONDITIONER AND A METHOD FOR CONTROLLING AN AIR CONDITIONER

(71) Applicant: LG ELECTRONICS INC., Seoul (KR)

(72) Inventors: Ji Hyun Jang, Seoul (KR); Donghwal Lee, Seoul (KR); Bohee Park, Seoul (KR); Sungho Seo, Seoul (KR); Hyunjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 17/172,477

(22) Filed: Feb. 10, 2021

(65) Prior Publication Data

US 2021/0262687 A1 Aug. 26, 2021

(30) Foreign Application Priority Data

Feb. 20, 2020 (KR) .......................... 10-2020-0020925

(51) Int. Cl.
*F24F 11/63* (2018.01)
*F24F 11/65* (2018.01)
(Continued)

(52) U.S. Cl.
CPC .............. *F24F 11/63* (2018.01); *F24F 1/027* (2013.01); *F24F 11/65* (2018.01); *F24F 11/77* (2018.01); *F24F 2110/10* (2018.01)

(58) Field of Classification Search
CPC .. F24F 11/63; F24F 1/027; F24F 11/65; F24F 11/77; F24F 2110/10; F24F 2120/20;
(Continued)

(56) References Cited

U.S. PATENT DOCUMENTS 6,009,716 A * 1/2000 Aoto .................. F24F 1/027
62/262
10,578,321 B2 * 3/2020 Henderson ............... F24F 11/50
(Continued)

FOREIGN PATENT DOCUMENTS

KR 10-0182743 5/1999
KR 10-0232155 12/1999
(Continued)

OTHER PUBLICATIONS

Korean Notice of Allowance dated Jul. 6, 2021 issued in Kr Application No. 10-2020-0020925.

*Primary Examiner* — Nelson J Nieves
*Assistant Examiner* — Matthew John Moscola
(74) *Attorney, Agent, or Firm* — KED & ASSOCIATES, LLP (57) ABSTRACT

An air conditioner and a method for controlling an air conditioner are provided capable of minimizing noise generation. The air conditioner may include an indoor motor configured to drive a fan to blow indoor air and an outdoor motor configured to drive a fan to blow outdoor air. In addition, the air conditioner may include a controller configured to set a rotational speed of the indoor motor to drive a fan to blow indoor air based on operation modes and a maximum rotational speed of the outdoor motor to drive a fan to blow outdoor air and change a rotational speed of the outdoor motor within a range not exceeding the maximum rotational speed based on indoor environment information and a user-set value.

15 Claims, 8 Drawing Sheets

(51) Int. Cl.
*F24F 1/027* (2019.01)
*F24F 11/77* (2018.01)
*F24F 110/10* (2018.01)

(58) Field of Classification Search
CPC . F24F 11/64; F24F 11/52; F24F 11/70; Y02B 30/70
See application file for complete search history.

(56) References Cited

U.S. PATENT DOCUMENTS

| | | | |
|---|---|---|---|
| 2005/0039480 A1* | 2/2005 | Kim | F24F 1/027 62/262 |
| 2005/0274135 A1* | 12/2005 | Kim | F24F 13/10 62/262 |
| 2018/0172305 A1* | 6/2018 | Son | F24F 11/77 |
| 2019/0219280 A1* | 7/2019 | Chitrala | F24F 3/0442 |
| 2021/0018202 A1* | 1/2021 | Atchison | F24F 11/67 |
| 2022/0235957 A1* | 7/2022 | Ishikawa | F24F 1/14 |

FOREIGN PATENT DOCUMENTS

| | | |
|---|---|---|
| KR | 10-2019-0010240 | 1/2019 |
| KR | 10-2019-0010766 | 1/2019 |
| WO | WO-2021130960 A1 * | 7/2021 |

* cited by examiner

AIR CONDITIONER AND A METHOD FOR CONTROLLING AN AIR CONDITIONER

CROSS-REFERENCE TO RELATED APPLICATION(S)

This application claims priority to and the benefit of Korean Patent Application No. 10-2020-0020925, filed in Korea on Feb. 20, 2020, the disclosure of which is incorporated herein by reference in its entirety.

BACKGROUND

1. Field

An air conditioner and a method for controlling an air conditioner are disclosed.

2. Background

Air conditioners may cool, heat, or purify air in a target space, or perform a humidification operation or a dehumidification operation on the target space. The air conditioner may include a compressor, a condenser, an expansion device, and an evaporator to cool the air in the target space, and the compressor, the condenser, the expansion device, and the evaporator are sequentially connected to a pipe. Refrigerant may circulate in the compressor, the condenser, the expansion device, and the evaporator through the pipe.

Air conditioners may include split-type air conditioners and integrated-type air conditioners. The split-type air conditioner may include an indoor unit located in an indoor space to discharge conditioned air into an indoor space and an outdoor unit connected to the indoor unit through a pipe and located in an outdoor space. The indoor unit may include an indoor heat exchanger and the outdoor unit may include an outdoor heat exchanger. When the split-type air conditioner performs a cooling operation, the outdoor heat exchanger may function as a condenser and the indoor heat exchanger may function as an evaporator. When the split-type air conditioner performs a heating operation, the indoor heat exchanger may function as the condenser and the outdoor heat exchanger may function as the evaporator.

For the integrated-type air conditioner, the condenser and the evaporator are accommodated together in a case. The condenser is disposed in an outdoor portion of the case to exchange heat with outside air and the evaporator is disposed in an indoor portion of the case to exchange heat with indoor air.

Korean Patent Publication No. 10-2019-0010240 (hereinafter, "related art document 1"), which is hereby incorporated by reference, discloses an integrated-type air conditioner. The air conditioner of related art document 1 rotates an evaporator fan to generate an indoor air flow and a condenser fan to generate an outdoor air flow with a motor. Therefore, there is a limitation in controlling noise generation.

BRIEF DESCRIPTION OF THE DRAWINGS

Embodiments will be described in detail with reference to the following drawings in which like reference numerals refer to like elements, and wherein.

DETAILED DESCRIPTION

Embodiments will be described with reference to the accompanying drawings, such that a person having ordinary knowledge in the art to which the embodiments pertain may easily implement the technical idea. Description of well-known technology relating to embodiments may be omitted if it unnecessarily obscures the gist. One or more embodiments are described with reference to the accompanying drawings. The same or like reference numerals may be used to refer to the same or like components.

It will be understood that, although the terms "first", "second", and the like may be used herein to describe various components, however, these components should not be limited by these terms. These terms are only used to distinguish one component from another component. Thus, a first component may be a second component unless otherwise stated.

In this document, the terms "upper," "lower," "on," "under," or the like are used such that, where a first component is arranged at "an upper portion" or "a lower portion" of a second component, the first component may be arranged in contact with the upper surface or the lower surface of the second component, or another component may be disposed between the first component and the second component. Similarly, where a first component is arranged on or under a second component, the first component may be arranged directly on or under (in contact with) the second component, or one or more other components may be disposed between the first component and the second component.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

Unless otherwise stated, each component may be singular or plural throughout the disclosure.

In some examples, singular expressions used include plural expressions unless the context clearly indicates otherwise. Terms such as "including" or "comprising" should not be construed as necessarily including all of the various components, or various steps described in the present disclosure, and terms such as "including" or "comprising" should be construed as not including some elements or some steps or further including additional elements or steps.

Unless otherwise stated, "A and/or B" means A, B or A and B. Unless otherwise stated, "C to D" means "C or more and D or less".

Hereinafter, an air conditioner and a method for controlling the air conditioner according to embodiments are described.

Figure 1:
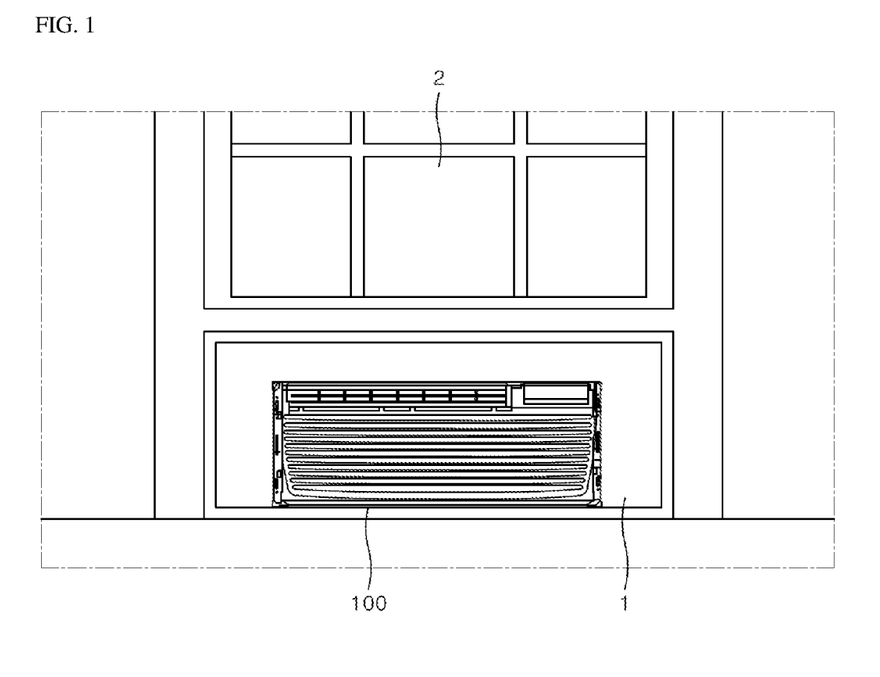
FIG. 1 shows an example of an air conditioner located in a wall.

FIG. 1 shows an example of an air conditioner 100. As shown in FIG. 1, the air conditioner 100 according to an embodiment may be an integrated-type air conditioner. In this structure, a condenser and an evaporator of the air conditioner 100 according to an embodiment may each be accommodated inside of a case. The condenser may be disposed in an outdoor space to exchange heat with outside air and the evaporator may be disposed in an indoor space to exchange heat with indoor air.

As shown in FIG. 1, a building has a wall 1 and a window 2, and the wall 1 may include a hole, that is, an installation space. The air conditioner 100 according to an embodiment may be placed in the hole, that is, in the installation space of the wall 1. In contrast to FIG. 1, the air conditioner 100 according to an embodiment may be placed in an installation space provided in an area where the window 2 is located.

Figure 2:
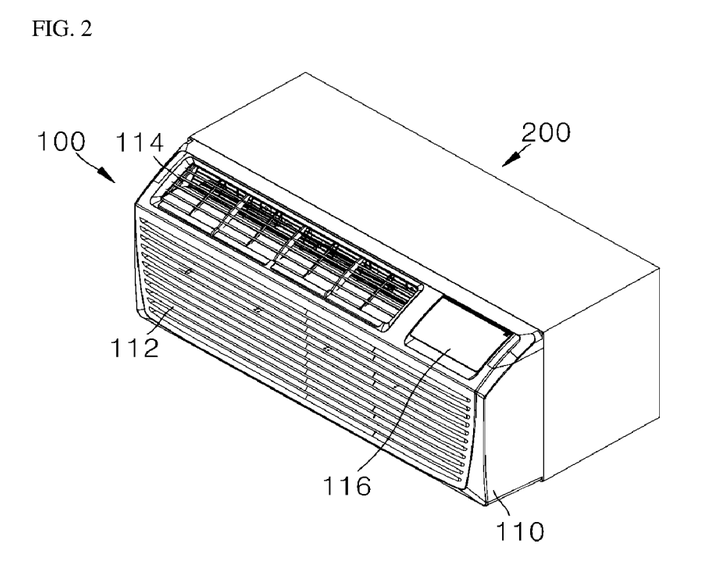
FIG. 2 is a schematic perspective view of an air conditioner according to an embodiment in a case.

FIG. 2 is a schematic perspective view of air conditioner 100 inserted into a case 200. The air conditioner 100 may be inserted into the case 200 through a front surface of the case 200 and may be fixed into the case 200. Hereinafter, a forward direction or a front surface refers to a direction toward the indoor space or a surface in that direction with respect to the wall 1 (see FIG. 1) or the window 2 (see FIG. 1) and a rearward direction or a rear surface refers to a direction toward a side opposite to the indoor space, that is, an outdoor space or a surface in that direction with respect to the wall 1 (see FIG. 1) or the window 2 (see FIG. 1).

The case 200 may have a hexahedral shape and a front portion defining an opening and may include an inner space. The case 200 may define at least one opening to suction and/or discharge air on a rear surface thereof. In addition, the case 200 may be fixed to the installation space of the air conditioner. The case 200 may be disposed in the installation space of the air conditioner in advance or may be provided to the user with the air conditioner 100.

The air conditioner 100 may include a front panel 110. The front panel 110 may include an indoor suction inlet 112 through which indoor air may be suctioned on a front surface thereof and an indoor discharge outlet 114 through which conditioned air may be discharged at an upper portion thereof. The air suctioned through the indoor suction inlet 112 may be heat-exchanged while passing through a main body of the air conditioner 100 and then discharged through the indoor discharge outlet 114.

The front panel 110 may include an interface opening 116 at an upper portion thereof. A display of a control box may be exposed through the interface opening 116, may indicate operation information of the air conditioner, and may also receive an input of a user operation command and/or a user-desired temperature.

Figure 3:
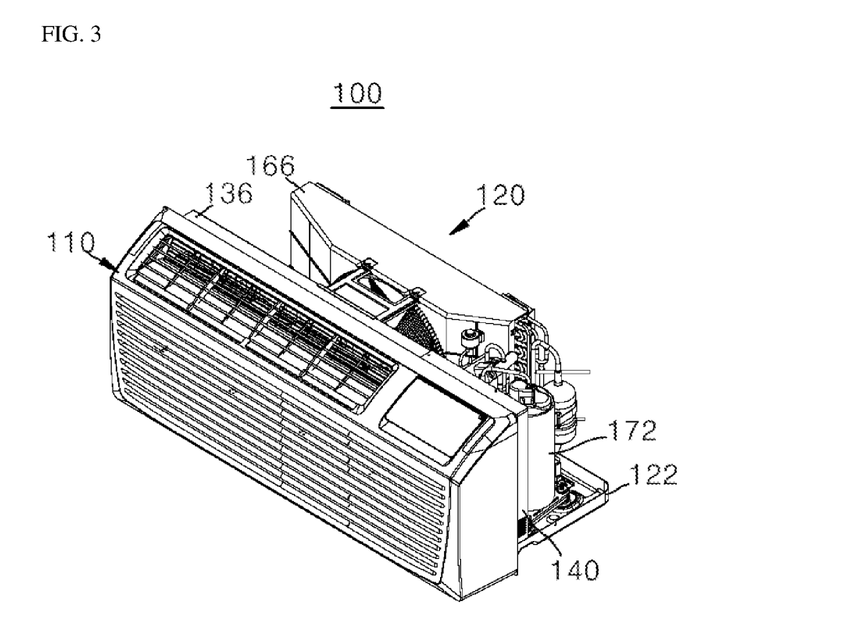
FIG. 3 is a schematic perspective view of the air conditioner of FIG. 2, when viewed from the front.
Figure 4:
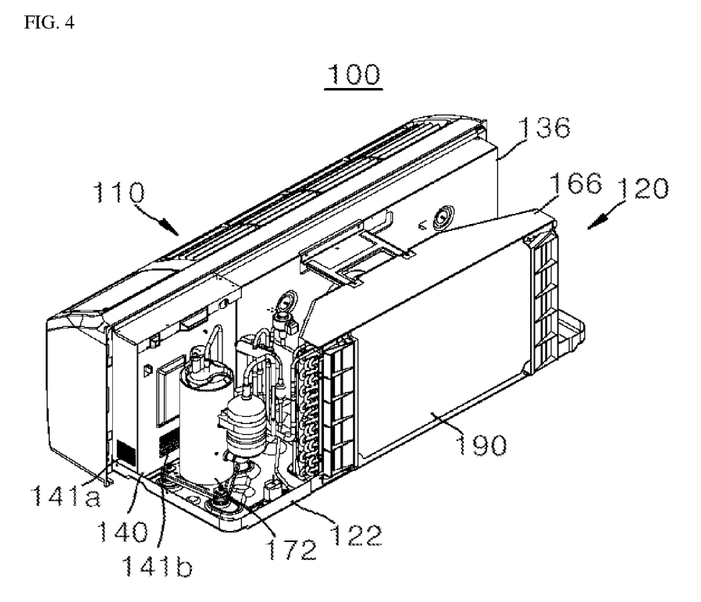
FIG. 4 is a schematic perspective view of the air conditioner of FIG. 2, when viewed from the rear.

FIG. 3 is a schematic perspective view of air conditioner 100, viewed from the front. FIG. 4 is a perspective view of air conditioner 100, viewed from the rear.

The air conditioner 100 according to an embodiment may include a front panel 110 and a main body 120. The main body 120 may include a base 122, an indoor main body disposed on the base 122, and an outdoor main body disposed on the base 122. The front panel 110 of the air conditioner 100 in FIGS. 3 and 4 may be the same as described with respect to FIG. 2.

The main body 120 may include base 122 and a plurality of components disposed on the base 122. The plurality of components may include the indoor main body and the outdoor main body. The plurality of components may include a barrier assembly 136, a control box 140, a shroud 166, a compressor 172, and a condenser 190. The main body 120 may be detachably coupled to the case 200. Accordingly, the main body 120 may be separated from the case 200 for replacement or repair of components.

As shown in FIG. 4, the control box 140 may define an air suction inlet 141a at a side thereof and an air discharge outlet 141b on a rear surface thereof. The control box 140 may be disposed at a boundary line between the indoor main body and the outdoor main body and define the air suction inlet 141a and the air discharge outlet 141b to prevent a possibility of penetration of rainwater into the control box 140 and circulate outdoor air in the control box 140.

Detailed functions and arrangements of components of the air conditioner 100 shown in FIGS. 3 and 4 are described hereinafter with reference to FIG. 5.

Figure 5:
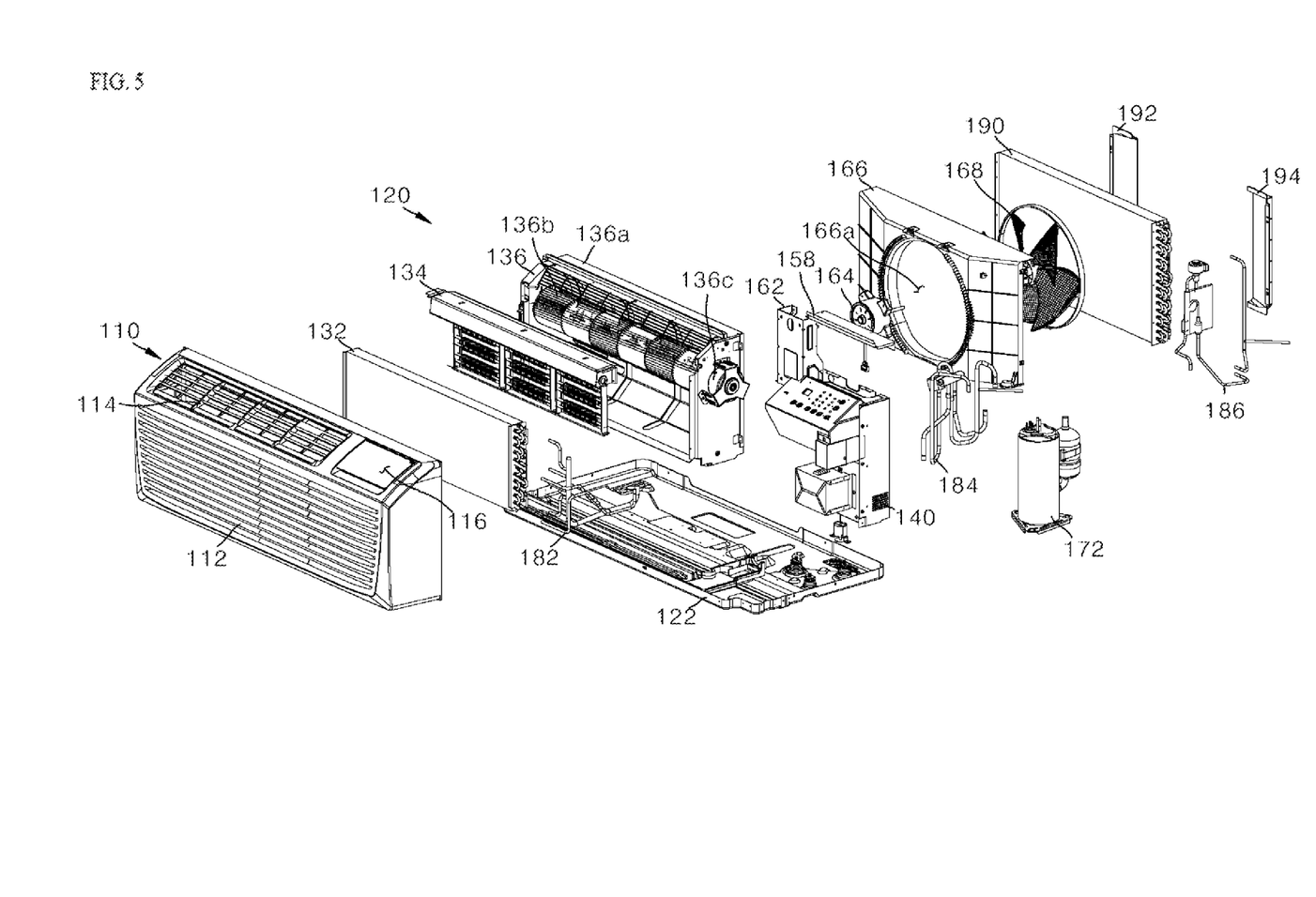
FIG. 5 is a schematic exploded perspective view of the air conditioner of FIG. 2.

FIG. 5 is a schematic exploded perspective view of air conditioner 100. The air conditioner 100 according to an embodiment may include front panel 110 and main body 120. The main body 120 may include base 122, an evaporator 132, a heater 134, barrier assembly 136, control box 140, a control box cover 158, a motor bracket 162, a condenser fan motor 164, shroud 166, a condenser fan 168, compressor 172, a plurality of pipes 182, 184, and 186, condenser 190, and rear grills 192 and 194.

The front panel 110 may be the same as described with respect to FIG. 2. The main body 120 may include base 122, the indoor main body, and the outdoor main body. The barrier assembly 136 and the control box 140 may both be disposed at a boundary between the outdoor main body and the indoor main body. A rear surface of the barrier assembly 136 and a main substrate inside of the control box 140 may form a boundary between the outdoor main body and the main indoor body, components disposed in front of the rear surface of the barrier assembly 136 and the main substrate inside of the control box 140 may constitute the indoor main body, and components disposed behind the rear surface of the barrier assembly 136 and the main substrate inside of the control box 140 may constitute the outdoor main body.

The evaporator 132 may be disposed on an inner surface of the front panel 110. Air suctioned through the indoor suction inlet 112 may pass through the evaporator 132 and be discharged through the indoor discharge outlet 114. Refrigerant condensed by the condenser 190 may be introduced into the evaporator 132 through a third pipe 186. The refrigerant may pass through the evaporator 132 and may be discharged to the compressor 172 through a first pipe 182. The third pipe 186 may include an expansion device configured to decompress the refrigerant condensed by the condenser 190. The air may be suctioned through the indoor suction inlet 112 and may be heat-exchanged with the refrigerant in the evaporator 132 while passing through the evaporator 132. A heater 134 may be disposed on a rear surface of the evaporator 132 to heat the air suctioned through the indoor suction inlet 112.

The barrier assembly 136 may be disposed behind the evaporator 132, that is, on a rear surface of the heater 134 disposed on the rear surface of the evaporator 132, to partition the outdoor main body and the indoor main body. That is, a rear plate 136a of the barrier assembly 136 may have a flat plate shape such that an indoor air flow path may be separated from an outdoor air flow path. The barrier assembly 136 may include a barrier structure including the rear plate 136a, an evaporator fan 136b rotatably fixed to the barrier structure, and an evaporator fan motor 136c fixed to the barrier structure. The evaporator fan 136b and the evaporator fan motor 136c may each be disposed in front of the rear plate 136a of the barrier assembly 136 and may each be included in the indoor main body. The evaporator fan motor 136c may rotate the evaporator fan 136b. The evaporator fan 136b may suction and discharge the air that has passed through the evaporator 132 and/or the heater 134. The air may be discharged into the indoor space by the evaporator fan 136b and through the indoor discharge outlet 114. That is, the evaporator fan 136b blows indoor air. The evaporator fan 136b may be a cross-flow fan.

At least a portion of a front surface of the control box 140 may be disposed on an inner surface of the front panel 110. Further, the control box 140 may be disposed at a side of the barrier assembly 136. In addition, the control box 140 may be spaced apart from the inner surface of the case 200 (see FIG. 2) by a predetermined distance or more. For example, a distance between a side surface of the case 200 (see FIG. 2) and an inner surface of the control box 140 may be equal to or greater than 15 mm. The control box 140 may control the evaporator fan motor 136c, the condenser fan motor 164, and the compressor 172. A configuration and operation of the control box 140 are described hereinafter with reference to FIGS. 6 and 7.

Control box cover 158 may be disposed on the control box 140 to cover an upper surface of the control box 140.

The motor bracket 162 may be disposed on a front surface of the condenser fan motor 164. The motor bracket 162 may support and fix the condenser fan motor 164.

The condenser fan motor 164 may be disposed between the rear plate 136a of the barrier assembly 136 and the shroud 166. The condenser fan motor 164 may rotate the condenser fan 168. For example, the condenser fan motor 164 may be arranged such that a center of a motor shaft of the condenser fan motor 164 corresponds to a center of a shroud opening 166a.

The shroud 166 may be disposed between the barrier assembly 136 and the condenser 190. The shroud 166 may be disposed behind the barrier assembly 136 and may be spaced apart from the barrier assembly 136. In addition, the shroud 166 may be coupled to the condenser 190. The shroud 166 may also be coupled to the condenser fan 168 to guide a flow of air passing through the condenser fan 168. The shroud 166 may include the shroud opening 166a to guide air to a suction side of the condenser fan 168. That is, outdoor air introduced into the case 200 (see FIG. 2) may be suctioned into the condenser fan 168 through the shroud opening 166a.

The condenser fan 168 may be disposed between the shroud 166 and the condenser 190. The condenser fan 168 may be disposed in a space formed by the shroud 166 in front of the condenser 190. The condenser fan 168 may be coupled to the shroud 166 to suction air through the shroud opening 166a and discharge the suctioned air to the condenser 190. That is, the condenser fan 168 may blow outdoor air. The condenser fan 168 may be an axial-flow fan to suction air in an axial direction and discharge the air in the axial direction.

The compressor 172 may be disposed in a space between a rear of the control box 140 and a side of the shroud 166. The compressor 172 may be spaced apart from each of the control box 140 and the shroud 166. A gas-liquid separator may be disposed at one side of the compressor 172. The compressor 172 may be connected to the evaporator 132 through the first pipe 182. The refrigerant discharged from the evaporator 132 may flow into the compressor 172 through the first pipe 182. The compressor 172 may compress the introduced refrigerant and discharge the refrigerant to the condenser 190 through the second pipe 184.

The condenser 190 may be disposed on a rear surface of the shroud 166. The condenser 190 may be coupled to the shroud 166 on the rear surface of the shroud 166. Air discharged from the condenser fan 168 may be discharged to the outdoor space through the condenser 190. Refrigerant discharged from the compressor 172 may flow into the condenser 190 through the second pipe 184. The condenser 190 may condense the introduced refrigerant and discharge the refrigerant to the evaporator 132 through the third pipe 186. Rear grills 192 and 194 may be disposed on a rear surface or both sides of the condenser 190 and guide air that has passed through the condenser 190.

Figure 6:
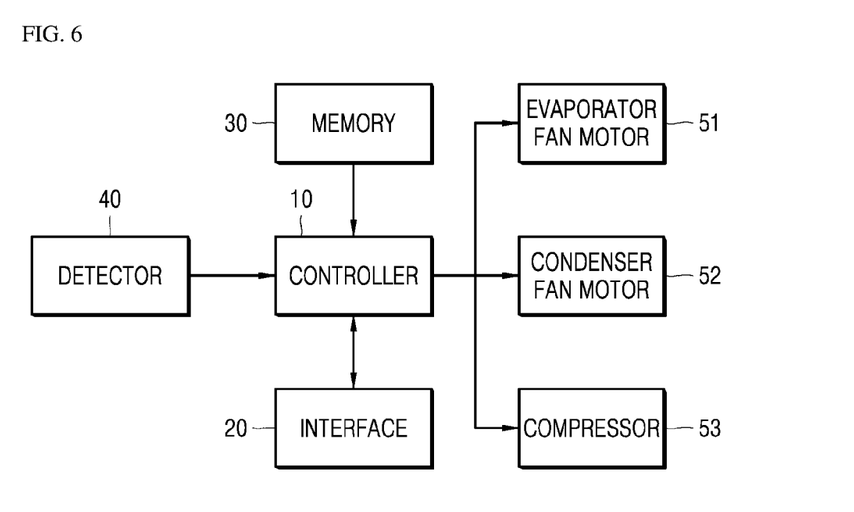
FIG. 6 is a block diagram of an air conditioner according to an embodiment.

FIG. 6 is a schematic block diagram of air conditioner according to an embodiment. The air conditioner according to an embodiment may include a controller 10, an interface 20, a memory 30, a sensor 40, an evaporator fan motor 51, a condenser fan motor 52, and a compressor 53. Arrangement and functions of the evaporator fan motor 51, the condenser fan motor 52, and the compressor 53 in FIG. 6 may be the same as the evaporator fan motor 136c, the condenser fan motor 164, and the compressor 172 described with respect to FIG. 5.

The controller 10 may control the evaporator fan motor 51, the condenser fan motor 52, and the compressor 53 based on at least one of indoor environment information measured by the sensor 40, user intention information input through the interface 20, or information stored in the memory 30. The indoor environment information may include indoor temperature information and/or indoor air quality information. State information of the air conditioner may include at least one of pressure information on pressure at an inlet side of the compressor 53, that is, at an introducing portion of refrigerant into the compressor 53, and temperature information of a pipe through which refrigerant moves, that is, a pipe between the evaporator 37 and the compressor 36. The user intention information may include at least one of operation mode information of the air conditioner, information for starting a cooling operation or a heating operation, set temperature information, or information for ending a cooling operation or a heating operation. The operation modes of the air conditioner may be subdivided based on a cooling strength and/or a heating strength, a strength of air discharged from the air conditioner, for example, a rotational speed of the evaporator fan motor 51, and a noise level, and may include at least four operation modes. The information stored in the memory 140 may include at least one of rotational speed information of the evaporator fan motor 51 and maximum rotational speed information of the condenser fan motor 52 in each of the operation modes of the air conditioner, pressure change rate information on pressure change rate at a suction side of the compressor 36 based on operating conditions, or control period information.

The controller 10 may include an outdoor controller and an indoor controller. The outdoor controller may be disposed in the outdoor main body of the main body 120 and the indoor controller may be disposed in the indoor main body of the main body 120. The outdoor controller and the indoor controller may communicate with each other.

The controller 10 may include at least one processing unit and a memory. The processing unit may include, for example, a central processing unit (CPU), a graphic processing unit (GPU), a microprocessor, an application specific integrated circuit (ASIC), and/or field programmable gate arrays (FPGA), for example, and may have multiple cores. The memory may be a volatile memory, for example, a random-access memory (RAM), a nonvolatile memory, for example, a read-only memory (ROM), or a flash memory, or a combination thereof. Computer-readable instructions for implementing a method for controlling an air conditioner according to an embodiment may be stored in the memory and other computer-readable instructions for implementing an operating system, and an application program, for example, may also be stored in the memory.

In addition, the controller 10 may include a communication interface capable of communication. The communication interface may include a modem, a network interface card (NIC), an integrated network interface, a radio frequency transmitter/receiver, an infrared port, a universal serial bus (USB) connection, or other interfaces. Further, the communication connection may include a wired connection or a wireless connection.

Operations of the controller 10 are described hereinafter with reference to FIG. 7.

The interface 20 may receive user intention information and provide the controller 10 with the received information. The user intention information may include at least one of operation mode information of the air conditioner, information for starting a cooling operation or a heating operation, set temperature information, or information for ending a cooling operation or a heating operation. In addition, the interface 20 may display operation information of the air conditioner. The operation information of the air conditioner may include at least one of a current operation mode of the air conditioner, a set temperature, an indoor temperature, or strength of discharged wind.

The memory 30 may store various pieces of information used to control, by the controller 10, the evaporator fan motor 51, the condenser fan motor 52, and the compressor 53. For example, the memory 30 may store at least one of a rotational speed of the evaporator fan motor 51 in each of the operation modes of the air conditioner, the maximum rotational speed of the condenser fan motor 52 in each of the operation modes of the air conditioner, a pressure change rate determined based on a temperature difference between an indoor temperature and a desired temperature in each of the operation modes, or a pipe temperature change rate determined based on a temperature difference between an indoor temperature and a desired temperature in each of the operation modes.

The sensor 40 may collect information used to operate the air conditioner and provide the controller 10 with the collected information. The information collected by the sensor 40 may include at least one of indoor temperature information, pressure information on pressure at an inlet of a compressor, or temperature information of a pipe through which the refrigerant flows. The sensor 40 may include a plurality of sensors.

Figure 7:
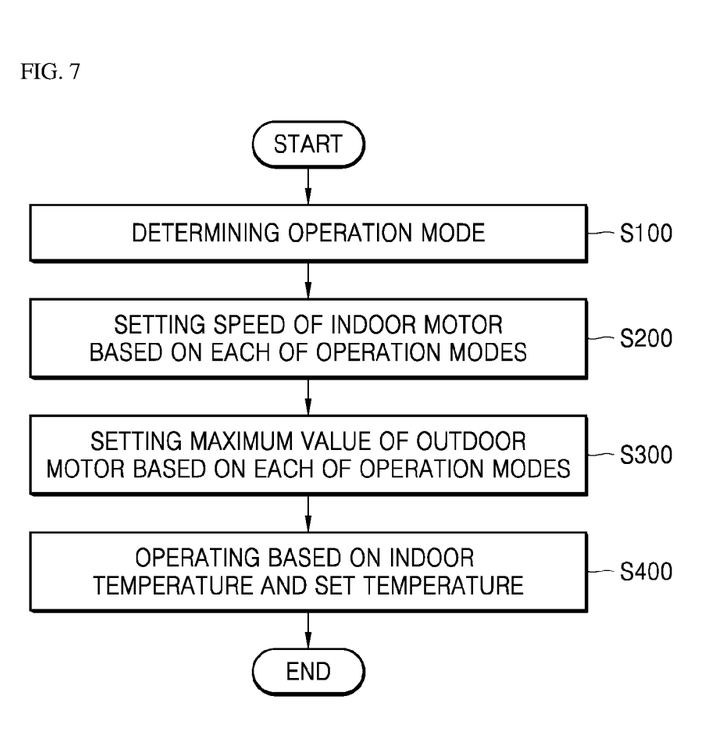
FIG. 7 is a flowchart of a method for controlling an air conditioner according to an embodiment.

FIG. 7 is a flowchart of a method for controlling an air conditioner according to an embodiment. Each operation or step shown in FIG. 7 may be performed by controller 10 in FIG. 6.

A controller 10 may determine an operation mode of the air conditioner (S100). The controller 10 may identify information input by the user through the interface 20 and identify the operation mode based on the information input by the user through the interface 20. The operation mode of the air conditioner may include at least four operation modes. For example, the operation mode of the air conditioner may include a super-low mode, a low mode, a intermediate mode, and a high mode.

The controller 10 may set a rotational speed of an indoor motor configured to drive an indoor fan to blow indoor air based on the identified operation mode of the air conditioner (S200). The controller 10 may access the memory 30 and set the rotational speed of the indoor motor based on the operation mode. The indoor fan may be evaporator fan 136*b* (see FIG. 5) and the indoor motor may be evaporator fan motor 136*c* (see FIG. 5) or 51 (see FIG. 6). For example, when the operation mode of the air conditioner is the super-low mode, the controller 10 may set the rotational speed of the indoor motor to rotate the indoor fan at a 1-1 speed, when the operation mode of the air conditioner is the low mode, rotate the indoor fan at a 1-2 speed which is greater than the 1-1 speed, when the operation mode of the air conditioner is the intermediate mode, rotate the indoor fan at a 1-3 speed which is greater than the 1-2 speed, and when the operation mode of the air conditioner is the high mode, rotate the indoor fan at a 1-4 speed which is greater than the 1-3 speed.

The controller 10 may set the maximum rotational speed of the outdoor motor configured to drive the outdoor fan to blow outdoor air based on the identified operation mode of the air conditioner (S300). The controller 10 may access the memory 30 and set the maximum rotational speed of the outdoor motor based on the operation mode. The outdoor fan may be condenser fan 168 (see FIG. 5) and the outdoor motor may be condenser fan motor 164 (see FIG. 5) or 52 (see FIG. 6). For example, the controller 10 may set the maximum rotational speed of the outdoor motor to adjust the maximum rotational speed of the outdoor fan to be the 2-1 speed when the operation mode of the air conditioner is the super-low mode, adjust the maximum rotational speed of the outdoor fan to be the 2-2 speed which is greater than the 2-1 speed when the operation mode of the air conditioner is the low mode, adjust the maximum rotational speed of the outdoor fan to be the 2-3 speed when the operation mode of the air conditioner is the intermediate mode, and adjust the maximum rotational speed of the outdoor fan to be the 2-4 speed which is greater than the 2-3 speed when the operation mode of the air conditioner is the high mode. Depending on the design, the rotational speed of the outdoor motor and the rotational speed of the outdoor fan may be the same.

Subsequently, the controller 10 may operate the air conditioner based on the indoor temperature and the set temperature (S400). For example, the controller 10 may control an indoor motor, for example, an evaporator fan motor 136*c* (see FIG. 5) or 51 (see FIG. 6)) to rotate at the rotational speed set at S200. In addition, the controller 10 may adjust a rotational speed of an outdoor motor, for example, the condenser fan motor 164 (see FIG. 5) or 52 (see FIG. 6) and operating frequency of the compressor 172 (see FIG. 5) or 53 (see FIG. 6) based on the indoor temperature and the set temperature. In this case, the controller 10 may control an outdoor motor, for example, a condenser fan motor 164 (see FIG. 5) or 52 (see FIG. 6) in order for the rotational speed of the outdoor motor, for example, condenser fan motor 164 (see FIG. 5) or 52 (see FIG. 6) not to exceed the maximum rotational speed set at S300.

Figure 8:
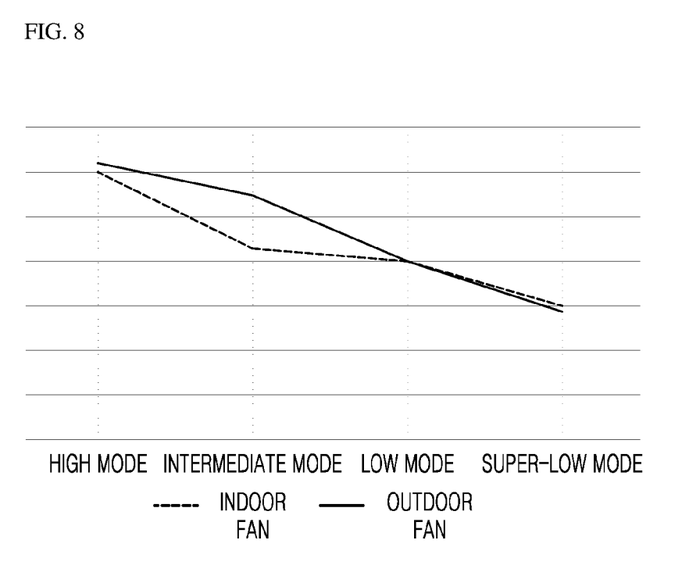
FIG. 8 shows examples of rotational speeds of an indoor fan and maximum rotational speeds of an outdoor fan in operation modes of an air conditioner.

FIG. 8 shows examples of rotational speeds of an indoor fan and maximum rotational speeds of an outdoor fan in operation modes of an air conditioner. The rotational speeds of the indoor fan are indicated by dotted lines and the maximum rotational speeds of the outdoor fan are indicated by solid lines.

As shown in FIG. 8, in a super-low mode, the rotational speed of the indoor fan is greater than the maximum rotational speed of the outdoor fan. That is, in the super-low mode, the rotational speed of the outdoor fan may be slower than the rotational speed of the indoor fan.

In a low mode, the rotational speed of the indoor fan may be the same as the maximum rotational speed of the outdoor fan. That is, in the low mode, the rotational speed of the outdoor fan may be equal to or less than the rotational speed of the indoor fan.

In each of an intermediate mode and a high mode, the rotational speed of the indoor fan may be less than the maximum rotational speed of the outdoor fan. In this case, a difference between the rotational speed of the indoor fan and the maximum rotational speed of the outdoor fan in the intermediate mode may be greater than a difference between the rotational speed of the indoor fan and the maximum rotational speed of the outdoor fan in the high mode.

With this configuration, necessary performance may be achieved while minimizing noise generation.

Table 1 below shows the result of measuring noise in each of the operation modes of the air conditioner according to an embodiment and shows the results of measuring noise when two air conditioners, that is, a first air conditioner and a second conditioner, are operated.

TABLE 1

| | First air conditioner | | | Second air conditioner | | |
|---|---|---|---|---|---|---|
| Mode | Sound pressure (dBA) | Loudness (sone) | Sharpness (acum) | Sound pressure (dBA) | Loudness (sone) | Sharpness (acum) |
| High | 51.8 | 7.9 | 1.09 | 52.6 | 8.2 | 1.08 |
| Intermediate | 47.4 | 5.5 | 0.89 | 47.2 | 5.5 | 0.94 |
| Low | 42.3 | 3.7 | 0.90 | 41.0 | 3.5 | 1.02 |
| Super-low | 38.6 | 2.5 | 0.94 | 37.6 | 2.6 | 1.08 |

Table 1 shows that the air conditioner according to an embodiment may maintain a relatively low sound pressure, especially when the air conditioner is operated in the super-low mode.

An air conditioner according to embodiments as an example of a cooling or heating apparatus to cool or heat indoor air and a method for controlling an air conditioner are described hereinabove; however, the concepts disclosed herein may be applied to various air conditioners or related devices that heat or purify air in a target space or perform a humidification operation or dehumidification operation on the target space.

According to embodiments disclosed herein, an air conditioner is provided capable of minimizing noise generation. According to embodiments disclosed herein, an air conditioner is further provided herein capable of providing subdivided operation modes thereof. According to embodiments disclosed herein, an air conditioner is furthermore provided capable of achieving necessary performance and obtaining reliability thereof.

According to embodiments disclosed herein, a method for controlling an air conditioner is provided capable of minimizing noise generation. According to embodiments disclosed herein, a method for controlling an air conditioner is further provided capable of providing subdivided operation modes thereof. According to embodiments disclosed herein, a method for controlling an air conditioner is furthermore provided capable of achieving necessary performance and obtaining reliability thereof.

The objects are not limited to the above-mentioned objects, and other objects and advantages which are not mentioned may be understood by the description and more clearly understood based on the embodiments. It will also be readily understood that objects and advantages may be implemented by features defined in claims and a combination thereof.

According to embodiments disclosed herein, an air conditioner is provided that may include an indoor motor configured to drive a fan to blow indoor air and an outdoor motor configured to drive a fan to blow outdoor air.

According to embodiments disclosed herein, an air conditioner and/or a method for controlling an air conditioner may enable setting a rotational speed of an indoor motor configured to drive a fan to blow indoor air based on each of operation modes and a maximum rotational speed of an outdoor motor configure to drive a fan to blow outdoor air and changing the rotational speed of the outdoor motor within a range not exceeding a maximum rotational speed based on indoor environment information and a user-set value.

According to embodiments disclosed herein, the air conditioner and/or the method for controlling the air conditioner may enable adjusting the rotational speed of the outdoor motor configured to drive the fan to blow the outdoor air and operation frequency of a compressor based on a difference between an indoor temperature and a set temperature and controlling the rotational speed of the outdoor motor not to exceed the maximum rotational speed set for each of operation modes of the air conditioner. In this case, the rotational speed of the indoor motor configured to drive the fan to blow the indoor air may have a fixed set value in each of the operation modes of the air conditioner.

According to embodiments disclosed herein, an air conditioner may include a base, an indoor fan disposed on the base and configured to blow indoor air, an outdoor fan disposed on the base and configured to blow outdoor air, an indoor motor disposed on the base and configured to drive the indoor fan, an outdoor motor disposed on the base and configured to drive the outdoor fan, and a controller configured to control the indoor motor and the outdoor motor based on indoor environment information and a user-set value. The controller may be configured to set a rotational speed of the indoor motor and a maximum rotational speed of the outdoor motor based on each of user-set operation modes of the air conditioner and control the indoor motor to rotate at the rotational speed and control the rotational speed of the outdoor motor not to exceed a maximum rotational speed. The air conditioner may further include an evaporator disposed in front of the indoor fan, a compressor configured to introduce refrigerant discharged from the evaporator, and a condenser disposed behind the outdoor fan and configured to introduce the refrigerant discharged from the compressor and discharge the refrigerant to the evaporator.

The indoor environment information of the air conditioner may include indoor temperature information, the user-set value may be a set temperature level, and the controller may be configured to adjust a rotational speed of the outdoor motor and operating frequency of the compressor based on a difference between the indoor temperature and the set temperature and control the rotational speed of the outdoor motor not to exceed the maximum rotational speed.

The indoor fan of the air conditioner may be a cross-flow fan. The outdoor fan may be an axial-flow fan.

The operation mode of the air conditioner may be determined based on the rotational speed of the indoor motor and include at least four operation modes. The operation mode of the air conditioner may include a super-low mode, a low mode, an intermediate mode, and a high mode. The controller may be configured to: when the operation mode of the air conditioner is the super-low mode, set the rotational speed of the indoor motor to rotate the indoor fan at a 1-1 speed and set the maximum rotational speed of the outdoor motor to adjust a maximum rotational speed of the outdoor fan to be a 2-1 speed, when the operation mode of the air conditioner is the low mode, set the rotational speed of the indoor motor to rotate the indoor fan at a 1-2 speed which is greater than the 1-1 speed and set the maximum rotational speed of the outdoor motor to adjust the maximum rotational speed of the outdoor fan to be a 2-2 speed which is greater than the 2-1 speed, when the operation mode of the air conditioner is the intermediate mode, set the rotational speed of the indoor motor to rotate the indoor fan at a 1-3 speed which is greater than the 1-2 speed and set the maximum rotational speed of the outdoor motor to adjust the maximum rotational speed of the outdoor fan to be a 2-3 speed which is greater than the 2-2 speed, and when the operation mode of the air conditioner is the high mode, set the rotational speed of the indoor motor to rotate the indoor fan at a 1-4 speed which is greater than the 1-3 speed and set the maximum rotational speed of the outdoor motor to adjust the maximum rotational speed of the outdoor fan to be a 2-4 speed which is greater than the 2-3 speed. The 1-1 speed of the air conditioner may be greater than the 2-1 speed, the 1-2 speed may be the same as the 2-2 speed, the 1-3 speed may be less than the 2-3 speed, and the 1-4 speed may be less than the 2-4 speed. Further, the air conditioner may have a difference between the 1-3 speed and the 2-3 speed which is greater than a difference between the 1-4 speed and the 2-4 speed.

The air conditioner may further include an interface configured to input the operation mode of the air conditioner and the set value and display operation information of the air conditioner. The air conditioner may further include a memory configured to store the rotational speed of the indoor motor and the maximum rotational speed of the outdoor motor in each of the operation modes. The controller may be configured to access the memory and set the rotational speed of the indoor motor and the maximum rotational speed of the outdoor motor based on each of the operation modes.

According to embodiments disclosed herein, a method for controlling an air conditioner is provided, the air conditioner including a base, an indoor fan disposed on the base and configured to blow indoor air, an indoor motor disposed on the base and configured to drive the indoor fan, an outdoor fan disposed on the base and configured to blow the outdoor air, an outdoor motor disposed on the based and configured to drive the outdoor fan, and a controller configured to control the indoor motor and the outdoor motor. The method may include determining, by the controller, a user-set operation mode of the air conditioner, setting, by the controller, a rotational speed of the indoor motor and a maximum rotational speed of the outdoor motor based on each of the operation modes, and controlling, by the controller, the indoor motor to rotate at the rotational speed, changing a rotational speed of the outdoor motor based on indoor environment information and a user-set value, and controlling the rotational speed of the outdoor motor not to exceed the maximum rotational speed.

In the method for controlling an air conditioner according to embodiments, the air conditioner may further include an evaporator disposed in front of the indoor fan, a compressor configured to introduce refrigerant discharged from the evaporator, and a condenser disposed behind the outdoor fan and configured to introduce the refrigerant discharged from the condenser and discharge the refrigerant to the evaporator. The indoor environment information may be indoor temperature information and a user-set value may be a set temperature level. The controlling may include adjusting an operating frequency of the compressor based on a difference between the indoor temperature and the set temperature and adjusting a rotational speed of the outdoor motor based on the difference between the indoor temperature and the set temperature.

In the method for controlling the air conditioner according to embodiments, the setting may include when the operation mode of the air conditioner including a super-low mode, a low mode, an intermediate mode, and a high mode is the super-low mode, setting the rotational speed of the indoor motor to rotate the indoor fan at a 1-1 speed and setting the maximum rotational speed of the outdoor motor to adjust a maximum rotational speed of the outdoor fan to be a 2-1 speed, when the operation mode of the air conditioner is the low mode, setting the rotational speed of the indoor motor to rotate the indoor fan at a 1-2 speed which is greater than the 1-1 speed and setting the maximum rotational speed of the outdoor motor to adjust the maximum rotational speed of the outdoor fan to be a 2-1 speed which is greater than the 2-1 speed, when the operation mode of the air conditioner is the intermediate mode, setting the rotational speed of the indoor motor to rotate the indoor fan at a 1-3 speed which is greater than the 1-2 speed and setting the maximum rotational speed of the outdoor motor to adjust the maximum rotational speed of the outdoor fan to be a 2-3 speed which is greater than the 2-2 speed, and when the operation mode of the air conditioner is the high mode, setting the rotational speed of the indoor motor to rotate the indoor fan at a 1-4 speed which is greater than the 1-3 speed and setting the maximum rotational speed of the outdoor motor to adjust the maximum rotational speed of the outdoor fan to be a 2-4 speed which is greater than the 2-3 speed.

The 1-1 speed may be greater than the 2-1 speed, the 1-2 speed may be the same as the 2-2 speed, the 1-3 speed may be less than the 2-3 speed, and the 1-4 speed may be less than the 2-4 speed. Further, a difference between the 1-3 speed and the 2-3 speed may be greater than a difference between the 1-4 speed and the 2-4 speed.

The air conditioner and the method for controlling an air conditioner according to embodiments disclosed herein may enable minimizing noise generation. Further, the air conditioner and the method for controlling an air conditioner according to embodiments disclosed herein may enable providing subdivided operation modes. The air conditioner and the method for controlling an air conditioner according to embodiments disclosed herein may enable achieving necessary performance and obtaining reliability.

Although embodiments have been described with reference to drawings hereinabove, embodiments are not limited to the embodiments and the drawings herein, and various modifications can be made by the skilled person in the art within the scope of the technical idea. Further, even if working effects obtained based on configurations are not explicitly described in the description of embodiments, effects predictable based on the corresponding configuration have to be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
   a base;
   an indoor fan disposed on the base and configured to blow indoor air;
   an indoor motor disposed on the base and configured to drive the indoor fan;
   an outdoor fan disposed on the base and configured to blow outdoor air;
   an outdoor motor disposed on the base and configured to drive the outdoor fan; and
   a controller configured to control the indoor motor and the outdoor motor based on indoor environment information and a user-set value, wherein the controller is configured to:
   set a rotational speed of the indoor motor and a maximum rotational speed of the outdoor motor based on each of a plurality of user-set operation modes of the air conditioner and
   control the indoor motor to rotate at the rotational speed and control the rotational speed of the outdoor motor not to exceed the maximum rotational speed, and wherein the operation mode of the air conditioner comprises a super-low mode, a low mode, an intermediate mode, and a high mode, and wherein the controller is configured to:
   when the operation mode of the air conditioner is the super-low mode, set the rotational speed of the indoor motor to rotate the indoor fan at a first indoor fan speed and set the maximum rotational speed of the outdoor motor to adjust a maximum rotational speed of the outdoor fan to be a first outdoor fan speed:
   when the operation mode of the air conditioner is the low mode, set the rotational speed of the indoor motor to rotate the indoor fan at a second indoor fan speed, which is greater than the first indoor fan speed, and set the maximum rotational speed of the outdoor motor to adjust the maximum rotational speed of the outdoor fan to be a second outdoor fan speed, which is greater than the first outdoor fan speed;
   when the operation mode of the air conditioner is the intermediate mode, set the rotational speed of the indoor motor to rotate the indoor fan at a third indoor fan speed, which is greater than the second indoor fan speed, and set the maximum rotational speed of the outdoor motor to adjust the maximum rotational speed of the outdoor fan to be a third outdoor fan speed, which is greater than the second outdoor fan speed; and
   when the operation mode of the air conditioner is the high mode, set the rotational speed of the indoor motor to rotate the indoor fan at a fourth indoor fan speed, which is greater than the third indoor fan speed, and set the maximum rotational speed of the outdoor motor to adjust the maximum rotational speed of the outdoor fan to a fourth outdoor fan speed, which is greater than the third outdoor fan speed, and wherein the first indoor fan speed is greater than the first outdoor fan speed, the second indoor fan speed is the same as the second outdoor fan speed, the third indoor fan speed is less than the third outdoor fan speed, and the fourth indoor fan speed is less than the fourth outdoor fan speed.

2. The air conditioner of claim 1, further comprising:
an evaporator disposed in front of the indoor fan;
a compressor configured to receive refrigerant discharged from the evaporator; and
a condenser disposed behind the outdoor fan and configured to receive the refrigerant discharged from the compressor and discharge the refrigerant to the evaporator.

3. The air conditioner of claim 2, wherein the indoor environment information includes an indoor temperature and the user-set value includes a set temperature level, and wherein the controller is configured to:
adjust a rotational speed of the outdoor motor and an operating frequency of the compressor based on a difference between the indoor temperature and the set temperature; and
control the rotational speed of the outdoor motor not to exceed the maximum rotational speed.

4. The air conditioner of claim 1, wherein the indoor fan is a cross-flow fan and the outdoor fan is an axial-flow fan.

5. The air conditioner of claim 1, wherein the rotational speed for the indoor motor is set according to the operation mode of the air conditioner.

6. The air conditioner of claim 1, wherein a difference between the third indoor fan speed and the third outdoor fan speed is greater than a difference between the fourth indoor fan speed and the fourth outdoor fan speed.

7. The air conditioner of claim 1, further comprising an interface configured to receive input of the operation mode of the air conditioner and the user-set value and display operation information of the air conditioner.

8. The air conditioner of claim 1, further comprising a memory configured to store the rotational speed of the indoor motor in each of the operation modes and the maximum rotational speed of the outdoor motor in each of the operation modes, wherein the controller is configured to access the memory and set the rotational speed of the indoor motor and the maximum rotational speed of the outdoor motor based on each of the operation modes.

9. A method for controlling an air conditioner, the air conditioner comprising a base, an indoor fan disposed on the base and configured to blow indoor air, an indoor motor disposed on the base and configured to drive the indoor fan, an outdoor fan disposed on the base and configured to blow outdoor air, an outdoor motor disposed on the base and configured to drive the outdoor fan, and a controller configured to control the indoor motor and the outdoor motor, the method comprising:
determining, by the controller, a user-set operation mode of the air conditioner;
setting, by the controller, a rotational speed of the indoor motor and a maximum rotational speed of the outdoor motor based on each of the operation modes of the air conditioner; and
controlling, by the controller, the indoor motor to rotate at the rotational speed, changing a rotational speed of the outdoor motor based on indoor environment information and a user-set value and controlling the rotational speed of the outdoor motor not to exceed the maximum rotational speed, and wherein the setting comprises:
when the operation mode of the air conditioner comprising a super-low mode, a low mode, an intermediate mode, and a high node is the super-low mode, setting the rotational speed of the indoor motor to rotate the indoor fan at a first indoor fan speed and setting a maximum rotational speed of the outdoor motor to adjust a maximum rotational speed of the outdoor fan to be a first outdoor fan speed;
when the operation mode of the air conditioner is the low mode, setting the rotational speed of the indoor motor to rotate the indoor fan at a second indoor fan speed, which is greater than the first indoor fan speed, and setting the maximum rotational speed of the outdoor motor to adjust the maximum rotational speed of the outdoor fan to be a second outdoor fan speed, which is greater than the first outdoor fan speed;
when the operation mode of the air conditioner is the intermediate mode, setting the rotational speed of the indoor motor to rotate the indoor fan at a third indoor fan speed, which is greater than the second indoor fan speed, and setting the maximum rotational speed of the outdoor motor to adjust the maximum rotational speed of the outdoor fan to be a third outdoor fan speed, which is greater than the second outdoor fan speed; and
when the operation mode of the air conditioner is the high mode, setting the rotational speed of the indoor motor to rotate the indoor fan at a fourth indoor fan speed, which is greater than the third indoor fan speed, and setting the maximum rotational speed of the outdoor motor to adjust the maximum rotational speed of the outdoor fan to be a fourth outdoor fan speed, which is greater than the third outdoor fan speed, and wherein the first indoor fan speed is greater than the first outdoor fan speed, the second indoor fan speed is the same as the second outdoor fan speed, the third indoor fan speed is less than the third outdoor fan speed, and the fourth indoor fan speed is less than the fourth outdoor fan speed.

10. The method of claim 9, wherein the air conditioner further comprises an evaporator disposed in front of the indoor fan, a compressor configured to introduce refrigerant discharged from the evaporator, and a compressor disposed behind the outdoor fan and configured to introduce the refrigerant discharged from the compressor and discharge the refrigerant to the evaporator, and wherein the controlling comprises:
adjusting an operating frequency of the compressor based on a difference between an indoor temperature and a set temperature; and
adjusting a rotational speed of the outdoor motor based on the difference between the indoor temperature and the set temperature, wherein the indoor environment information includes the indoor temperature and the user-set value includes the set temperature.

11. The method of claim 9, wherein a difference between the third indoor fan speed and the third outdoor fan speed is greater than a difference between the fourth indoor fan speed and the fourth outdoor fan speed.

12. An air conditioner, comprising:
a base;
an evaporator fan disposed on the base and configured to blow indoor air;
an evaporator fan motor disposed on the base and configured to drive the evaporator fan;
an evaporator disposed in front of the evaporator fan;
a compressor configured to receive refrigerant discharged from the evaporator;
a condenser fan disposed on the base and configured to blow outdoor air;
a condenser fan motor disposed on the base and configured to drive the condenser fan;
a condenser disposed behind the condenser fan and configured to receive the refrigerant discharged from the compressor and discharge the refrigerant to the evaporator; and
a controller configured to control the evaporator fan motor and the condenser fan motor based on an indoor temperature and a user-set temperature, wherein the controller is configured to:
   set a rotational speed of the evaporator fan motor and a maximum rotational speed of the condenser fan motor based on each of a plurality of user-set operation modes of the air conditioner and
   control the evaporator fan motor to rotate at the rotational speed and control the rotational speed of the condenser fan motor not to exceed the maximum rotational speed, and wherein the operation mode of the air conditioner comprises a super-low mode, a low mode, an intermediate mode, and a high mode, and wherein the controller is configured to:
      when the operation mode of the air conditioner is the super-low mode, set the rotational speed of the evaporator fan motor to rotate the evaporator fan at a first evaporator fan speed and set the maximum rotational speed of the condenser fan motor to adjust a maximum rotational speed of the condenser fan to be a first condenser fan speed;
      when the operation mode of the air conditioner is the low mode, set the rotational speed of the evaporator fan motor to rotate the evaporator fan at a second evaporator fan speed, which is greater than the first evaporator fan speed, and set the maximum rotational speed of the condenser fan motor to adjust the maximum rotational speed of the condenser fan to be a second condenser fan speed, which is greater than the first condenser fan speed;
      when the operation mode of the air conditioner is the intermediate mode, set the rotational speed of the evaporator fan motor to rotate the evaporator fan at a third evaporator fan speed, which is greater than the second evaporator fan speed, and set the maximum rotational speed of the condenser fan motor to adjust the maximum rotational speed of the condenser fan to be a third condenser fan speed, which is greater than the second condenser fan speed; and
      when the operation mode of the air conditioner is the high mode, set the rotational speed of the evaporator fan motor to rotate the evaporator fan at a fourth evaporator fan speed, which is greater than the third evaporator fan speed, and set the maximum rotational speed of the condenser fan motor to adjust the maximum rotational speed of the condenser fan to a fourth condenser fan speed, which is greater than the third condenser fan speed, and wherein the first evaporator fan speed is greater than the first condenser fan speed, the second evaporator fan speed is the same as the second condenser fan speed, the third evaporator fan speed is less than the third condenser fan speed, and the fourth evaporator fan speed is less than the fourth condenser fan speed.

13. The air conditioner of claim 12, wherein the controller is configured to:
   adjust a rotational speed of the condenser fan motor and an operating frequency of the compressor based on a difference between the indoor temperature and the user-set temperature; and
   control the rotational speed of the condenser fan motor not to exceed the maximum rotational speed.

14. The air conditioner of claim 12, wherein the evaporator fan is a cross-flow fan and the condenser fan is an axial-flow fan.

15. The air conditioner of claim 12, wherein the rotational speed for the evaporator fan motor is set according to the operation mode of the air conditioner, and the operation mode comprises at least four operation modes.

* * * * *